United States Patent [19]

Moore et al.

[11] Patent Number: 5,042,246

[45] Date of Patent: Aug. 27, 1991

[54] CONTROL SYSTEM FOR SINGLE SHAFT COMBINED CYCLE GAS AND STEAM TURBINE UNIT

[75] Inventors: James H. Moore; Jens Kure-Jensen; William I. Rowen, all of Schenectady, N.Y.

[73] Assignee: General Electric Company, Schenectady, N.Y.

[21] Appl. No.: 431,892

[22] Filed: Nov. 6, 1989

[51] Int. Cl.[5] .......................... F02C 6/18; F02C 7/268
[52] U.S. Cl. ................................ 60/39.03; 60/39.142; 60/39.182
[58] Field of Search ............... 60/39.02, 39.03, 39.141, 60/39.142, 39.182, 39.26, 39.3

[56] References Cited

U.S. PATENT DOCUMENTS

| | | | |
|---|---|---|---|
| 2,936,028 | 5/1960 | Gatzemeyer et al. | 158/36.4 |
| 3,097,488 | 7/1963 | Eggenberger | 60/73 |
| 3,098,190 | 7/1963 | Spencer, Jr. et al. | 322/29 |
| 3,150,487 | 9/1964 | Mangan et al. | 60/39.18 |
| 3,198,954 | 8/1965 | Eggenberger et al. | 290/40 |
| 3,340,883 | 9/1967 | Peternel | 137/26 |
| 3,418,806 | 12/1968 | Wagner et al. | 60/39.51 |
| 3,505,811 | 4/1970 | Underwood | 60/39.03 |
| 3,520,133 | 7/1970 | Loft et al. | 60/39.14 |
| 3,561,216 | 2/1971 | Moore, Jr. | 60/73 |
| 3,601,617 | 8/1971 | De Mello et al. | 290/40 C |
| 3,738,104 | 6/1973 | Rosa | 60/39.28 R |
| 4,081,956 | 4/1978 | Baker et al. | 60/39.182 |
| 4,519,207 | 5/1985 | Okabe et al. | 60/39.182 |
| 4,532,761 | 8/1985 | Takaoka et al. | 60/39.13 |
| 4,793,132 | 12/1988 | Okabe | 60/39.182 |

FOREIGN PATENT DOCUMENTS

| | | |
|---|---|---|
| 58-74809 | 7/1983 | Japan . |
| 160502 | 9/1983 | Japan ............................. 60/39.182 |
| 61-87902 | 9/1986 | Japan . |
| 1050063 | 12/1966 | United Kingdom . |
| 2017219 | 10/1979 | United Kingdom . |
| 2099515 | 12/1982 | United Kingdom . |

Primary Examiner—Louis J. Casaregola
Attorney, Agent, or Firm—Nixon & Vanderhye

[57] ABSTRACT

A method for starting and loading a combined cycle turbine of the type having a gas turbine with a fuel flow control valve and a steam turbine with at least one steam control valve both disposed on a single shaft and having a heat recovery steam generator heated by said gas turbine and connected to supply steam to the steam control valve, the combined cycle turbine having a unified control system and driving a load and also having an auxiliary steam source connected to the steam control valve. The improved method comprises starting and cranking the combined unit by controlling steam from the auxiliary steam source with the steam control valve, initiating and controlling fuel flow to the gas turbine with the fuel flow control valve, initiating combustion, controlling acceleration of the combined unit with the steam control valve, transferring acceleration control of the combined unit to the gas turbine fuel flow control valve, and accelerating the combined unit to rated speed. The method further includes the steps of synchronizing the combined unit to the line, substituting steam from the heat recovery steam generator for that from the auxiliary steam source, and opening said steam control valves to a full open position.

6 Claims, 4 Drawing Sheets

CONTROL SYSTEM FOR SINGLE SHAFT COMBINED CYCLE GAS AND STEAM TURBINE UNIT

BACKGROUND OF THE INVENTION

This invention relates generally to an improved method for starting up and synchronizing a combined cycle turbine of the type having a gas turbine and steam turbine on a single shaft. More particularly, the invention relates to a unit startup program and a unit loading program for a combined cycle turbine, which is carried out by a unified control system. The method includes providing startup from standstill, firing the gas turbine, carrying out acceleration control, protecting the steam turbine against excessive heating, synchronizing the unit to the line and loading the combined cycle turbine in an optimum manner.

In some large combined cycle power plants the steam turbine and gas turbine are solidly coupled on a single shaft to drive a single electrical generator. The primary source of energy input to the rotating machine is the fuel which is burned in the gas turbine combustors. This shows up almost immediately as power delivered by the gas turbine. The waste heat from the gas turbine generates steam. This steam is utilized by a steam turbine as a secondary source of power input to the rotating train which is generated by a heat recovery steam generator (HRSG). While there is some time lag before heat from the gas turbine exhaust gas manifests itself as a power input source in the form of steam available at the turbine control valves, the control of the two sources of energy must be coordinated in order to properly control and protect the rotating machinery.

When synchronized with the electrical grid the speed of the machine is determined by the frequency of the grid. Of the total mechanical power produced from the fuel to drive the generator, approximately two-thirds is produced by the gas turbine and one-third by the steam turbine from the thermal energy recovered from the gas turbine exhaust. In most cases, all of the steam produced by the heat of the gas turbine exhaust is expanded through the steam turbine. In other cases, some of the steam is extracted from the power cycle for process uses. In the former case, the steady state control of electrical output, therefore, is achieved entirely by controlling fuel flow, with the steam control valve or valves maintained in the fully open position. When not synchronized, on the other hand, either fuel flow to the gas turbine, steam flow to the steam turbine, or both, must be controlled to control speed, and there is not always a direct relationship between the two.

During startup, before sufficient steam is generated from the heat recovery steam generator, under some conditions the control valves to the steam turbine may be closed. With no steam flow through the rotating turbine blades, excessive "windage" will cause the turbine to overheat. U.S. Pat. No. 4,519,207 to Okabe et al has suggested that an ancilliary steam source be provided to introduce flow through the steam turbine in a single shaft combined cycle to avoid overheating of steam turbine due to windage loss.

Elaborate startup programs and control systems have been developed for starting up steam turbines and gas turbines. Combined cycle units in a plant made up of several units, each consisting of gas turbine and steam turbine on a separate shaft have been suggested, as described in U.S. Pat. No. 4,532,761—Takaoka, issued Aug. 6, 1985. This combined station control, therefor, deals with multiple, separately controlled shafts. Steam turbines have different startup problems than gas turbines, and the control systems have developed separately for the two types of prime movers in order to address these problems. This invention relates to a single combined cycle unit and its unified control system.

A gas turbine is incapable of self starting from standstill. Torque from an external source is required for cranking to a speed at which ignition can occur and then to a higher speed at which operation becomes self sustaining and the gas turbine produces sufficient torque to accelerate to operating speed.

Large combined cycle steam and gas turbines on a single shaft require a very large cranking device for starting. The prior art has suggested a separate starting motor for the combined unit or, if the combined unit is driving a generator, using the generator as a motor to crank the combined unit.

A conventional gas turbine startup program controls the cranking device and the sequential operations involved with the startup. A typical program is as follows:

(1.) Beginning with the fuel stop valve closed, the cranking device accelerates the unit to 25–30% of rated speed and holds for several minutes to purge the exhaust system combustible gases.

(2.) Speed is reduced to 10–15% of rated for light off. The fuel stop valve is opened, a fixed fuel flow is admitted and ignition initiated.

(3.) After light off, fuel flow is reduced to warm up level for one minute.

(4.) The cranking device is then set for maximum torque and the fuel flow command is programmed to increase on a predetermined schedule.

An error signal is the difference between a reference or desired value of an operating condition and the actual measured value of the operating condition. The gas turbine control system utilizes several such error signals to develop several fuel command signals which are applied to a "minimum value gate". The small fuel flow command generated by the startup fuel schedule is selected by the minimum value gate unless temperature or other limitations have a smaller fuel command signal. As speed approaches the governor setpoint, the speed error requires the smallest fuel command and becomes the controlling signal. An integrated gas turbine control system providing for open loop programmed start-up control with a number of closed loop constraints simultaneously controlling the gas turbine in accordance with operating conditions such as temperature, speed and acceleration is described in U.S. Pat. No. 3,520,133 issued July 14, 1970 to Daniel Johnson and Arne Loft.

A steam turbine, on the other hand, is self-starting as soon as steam is admitted through the control valve, but due to need to allow temperatures to equalize in the rotor and shell, startup programs have been developed for starting and loading a steam turbine in accordance with allowable thermal stress in a controlled manner as disclosed in U.S. Pat. No. 3,561,216—Moore, issued Feb. 9, 1971. Combining acceleration and speed control through the use of a minimum value gate are shown in U.S. Pat. No. 3,340,883—Peternel, issued Sept. 12, 1967.

Unified control systems have been proposed for single shaft combined cycle plants with supplemental firing of fuel in the heat recovery steam generator which attempted to force a programmed load split between the gas turbine and the steam turbine, such a system being disclosed in U.S. Pat. No. 3,505,811 to F. A. Underwood issued Apr. 14, 1970. However, improved thermodynamic performance can be achieved by designing the system so that the steam valve operates in the full open position. In this way, the steam turbine accepts the total generation capacity of the steam generator over the entire load range without responding to small or slow speed variations which would require steam valve adjustment.

As load is increased on the gas turbine, more heat energy will flow with the exhaust gas to the HRSG where it will cause an increase in steam flow to the steam turbine. This will cause the steam pressure to rise so that the steam turbine will absorb this flow without any control action. A reduction in gas turbine load will, in similar manner, result in a reduced steam flow to the steam turbine. Thus, the steam turbine will follow the load changes on the gas turbine with some time delay.

While this provides optimum thermodynamic performance under steady state or slowly varying load changes, disturbances in steady or quasi-steady operation may occur. Two of these will be discussed in the following, (1) Proportional control, and (2) Power load unbalance control:

(1.) A gradual rise in shaft speed above rated speed will cause the gas turbine speed control to reduce fuel flow and hence power to the shaft in a proportional manner with speed rise. According to the present invention, as long as the shaft speed is below a preset value, the steam turbine will only respond by a reduced output as the steam flow from the HRSG is reduced.

A rise in combined shaft speed above the preset value will cause the steam valves to go closed in a manner proportional to the speed rise. This will reduce the steam flow to minimum flow level and hence shut off the steam flow as a contributor to excessive overspeed.

(2.) In the event of sudden loss of full electrical load, the above described proportional action may not occur fast enough to limit the speed rise of the unit to a value that will not cause the overspeed trip to activate, typically at 110% rated speed. Modern fossil fired steam turbines use a power-load unbalance system to control overspeed to a value below that of the setting of the overspeed trip. This permits the unit to experience a load rejection, yet remain running under speed control at or near synchronous speed. Thus, the unit can, if desired, continue to carry station auxiliary load and also be in a condition for prompt resynchronizing with the system. Such power load unbalance systems are shown in U.S. Pat. No. 3,198,954 in the name of M. A. Eggenberger et al issued Aug. 3, 1965 or in U.S. Pat. No. 3,601,617 to DeMello et al issued Aug. 24, 1971.

Accordingly, one object of the present invention is to provide an improved method for starting, synchronizing and loading a single shaft combined cycle turbine.

Another object of the invention is to provide an improved unified control system for coordinating controlled startup, synchronization and loading of a single shaft combined cycle plant, including transfer of control between steam turbine and gas turbine.

SUMMARY OF THE INVENTION

Briefly stated, the invention is practiced by carrying out an improved method for starting and loading a combined cycle turbine of the type having a gas turbine with a fuel flow control valve and a steam turbine with at least one steam control valve both disposed on a single shaft and having a heat recovery steam generator heated by said gas turbine and connected to supply steam to the steam turbine control valve, the combined cycle turbine having a unified control system and driving a load and also having an auxiliary steam source connected to the steam control valve. The improved method comprises starting and cranking the combined unit by controlling steam from the auxiliary steam source with the steam control valve, initiating and controlling fuel flow to the gas turbine with the fuel flow control valve, initiating combustion, controlling acceleration of the combined unit with the steam control valve, transferring acceleration control of the combined unit to the gas turbine fuel flow control valve, and accelerating the combined unit to rated speed. Preferably, the transfer method includes utilization of an acceleration reference controlling position of the steam control valve which is set lower than an acceleration reference for the fuel flow control valve. The method further includes the steps of synchronizing the combined unit to the line, substituting steam from the heat recovery steam generator for that from the auxiliary steam source, and opening said steam control valves to a full open position.

DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

DESCRIPTION OF THE PREFERRED EMBODIMENT

Figure 1:
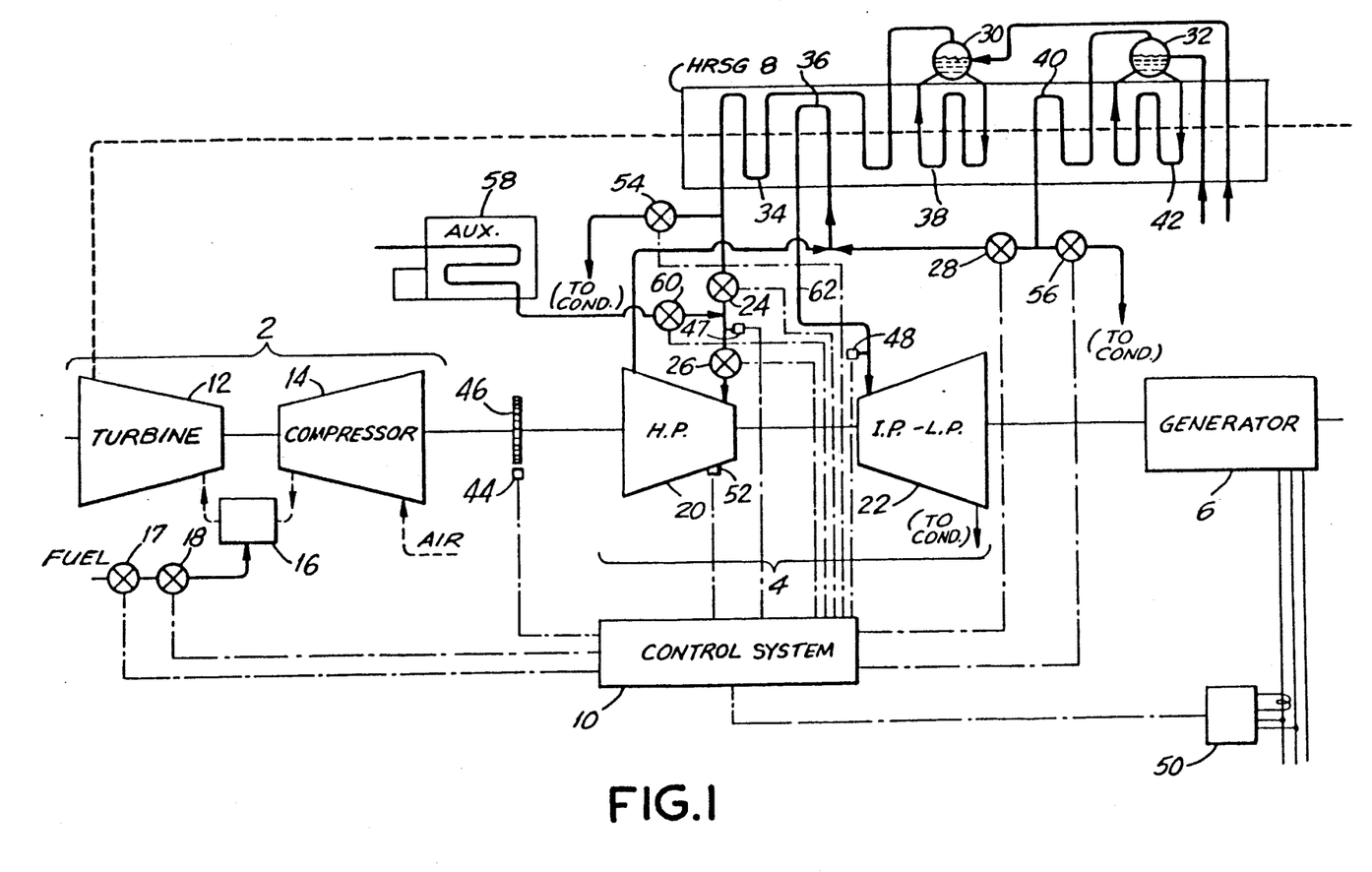
FIG. 1 is a simplified schematic view of a single shaft combined cycle unit.

Referring to FIG. 1 of the drawing, a gas turbine 2 is connected in tandem with a steam turbine 4 to a load, such as generator 6. The hot exhaust gas from gas turbine 2 flows through a heat recovery steam generator (HRSG) 8, which supplies steam to steam turbine 4. The entire system is controlled by a unified control system designated 10.

The elements of gas turbine 2 are an expander 12, an air compressor 14, and a combustion chamber 16 supplied with fuel through a fuel stop valve 17 and a fuel control valve 18. Steam turbine 4 comprises a high pressure section 20 and a lower pressure section 22 (combined intermediate pressure and low pressure section). "Primary" throttle steam from HRSG 8 flows through a stop valve 24, and control valves 26, to the inlet of the high pressure steam turbine section 20. A supplementary flow of "secondary" steam at a lower pressure level from HRSG 8 is admitted through a secondary steam valve 28, where it joins steam which has been expanded through turbine section 20 and before entering the reheater.

Heat recovery steam generator 8 has associated with it a high pressure steam drum 30, low pressure steam drum 32, and contains banks of steam generating, superheating, reheating and feed water heating tubes which may vary in arrangement from one power plant to another. The disclosed arrangement includes high pressure superheat section 34, reheater section 36, high pressure steam generating tubes 38, low pressure superheat tubes 40, and low pressure steam generating tubes 42.

The control system 10 includes means for sensing operating conditions of the combined cycle plant. These include a speed sensor 44 responsive to speed of a toothed wheel 46. The speed sensor 44 also serves as an acceleration sensitive device, since the speed signal may be differentiated with respect to time. Main steam pressure ahead of control valves 26 is measured by a steam pressure sensor 47. A measurement representing power input of the steam turbine is carried out using another steam pressure sensor 48 measuring steam pressure at the I. P. turbine inlet. Measurement of load is carried out using a kilowatt sensor 50 which is responsive to current and voltage on the generator output lines. Alternately, generator current alone may be measured as a rough indication of load. Steam turbine metal temperature is measured by one or more sensors such as 52. Only a representative number of sensors are shown in FIG. 1, a great many more being used in actual practice.

Steam bypass valves 54, 56 and an auxiliary, separately fired steam generator 58 with auxiliary steam inlet valve 60 are shown, it being understood that in actual practice a great many more valves and auxiliary devices would be necessary. Instead of an auxiliary steam generator, another source of auxiliary steam to the inlet valve 60 could be the heat recovery steam generator of another combined cycle turbine.

All of the steam admission valves 24, 28, 60 are provided with actuators to position the valves in response to signals from a unified control system 10. The gas turbine fuel valve 18 determines the rate of fuel flow to the gas turbine in response to a fuel flow command signal.

The rotating members of steam turbine sections 20 and 22 are solidly coupled by a rigid (non-flexible) coupling and, in turn, the steam turbine 4 is solidly coupled to the generator 6 by a rigid coupling. The rotating members of gas turbine 2 are solidly coupled to the rotating members of steam turbine 4 by means of rigid couplings, and the system is provided with a single thrust bearing for all of the tandem-connected shafts referred to hereinafter as a "single shaft". Thus the rotating members are coupled together, and the gas and steam turbines operate as a single unit under control of unified control system 10.

Although it is not a required feature of the invention, FIG. 1 illustrates a steam turbine in which the conventional intercept reheat valve and the reheat stop valve have been eliminated. A valveless steam conduit 62 directly connects the outlet of steam reheater section 36 with the inlet of lower pressure steam turbine section 22. Steam flowing through conduit 62 consists of expanded steam from the outlet of the high pressure turbine section 20 and supplementary steam flowing through supplementary steam valve 28 from the low pressure superheat tubes 40. In some plants having only a single pressure level HRSG, the supplementary steam would not be generated or added to steam entering the reheater 36. The invention is also useful in combined cycle plants where steam is generated at three different pressures, all being admitted to the steam turbine.

Figure 2:
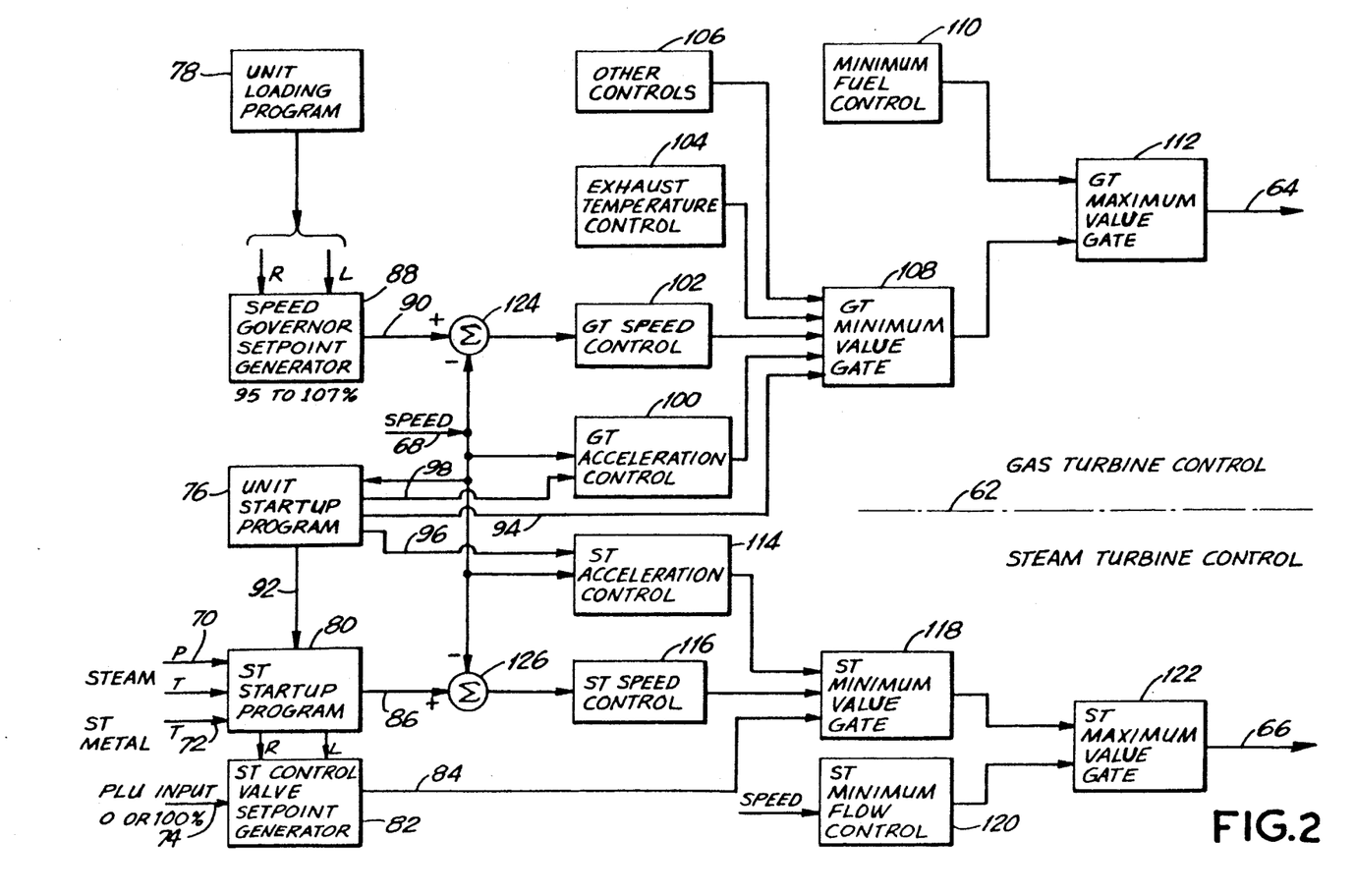
FIG. 2 is a simplified block diagram of a unified combined cycle turbine control.

Referring now to FIG. 2 of the drawing, the unified control system 10 of FIG. 1 is illustrated in block diagram form. The upper part of the diagram above line 62 comprises the portion of the control which results in an output signal 64 in the form of a fuel flow command signal to the gas turbine fuel flow control valve (18 in FIG. 1). The means by which the fuel flow rate to the gas turbine is controlled by this signal is not material to the present invention. For example, the fuel flow command signal may cause fuel pressure to vary or may deliver fuel at a controlled rate as well as to divide it into equal portions for the combustion chambers as disclosed in U.S. Pat. No. 2,936,028 issued to J. B. Gatzmeyer et al on May 10, 1960, or in the aforementioned U.S. Pat. No. 3,520,133 to Johnson and Loft, or may operate a servo valve to adjust flow by bypassing a fuel pump feeding a flow divider as shown in U.S. Pat. No. 3,738,104—Rosa issued June 12, 1973.

The lower part of FIG. 2 represents the steam turbine portion of the control, which results in a steam flow command signal to the steam valves representing a desired valve position. There may be a number of steam valves controlled by the signal according to a schedule of opening and closing, the number of such valves being immaterial to the present invention. These are represented by the single control valve 26 leading to the high pressure turbine shown in FIG. 1 and referred to simply as a "control valve".

Figure 4:
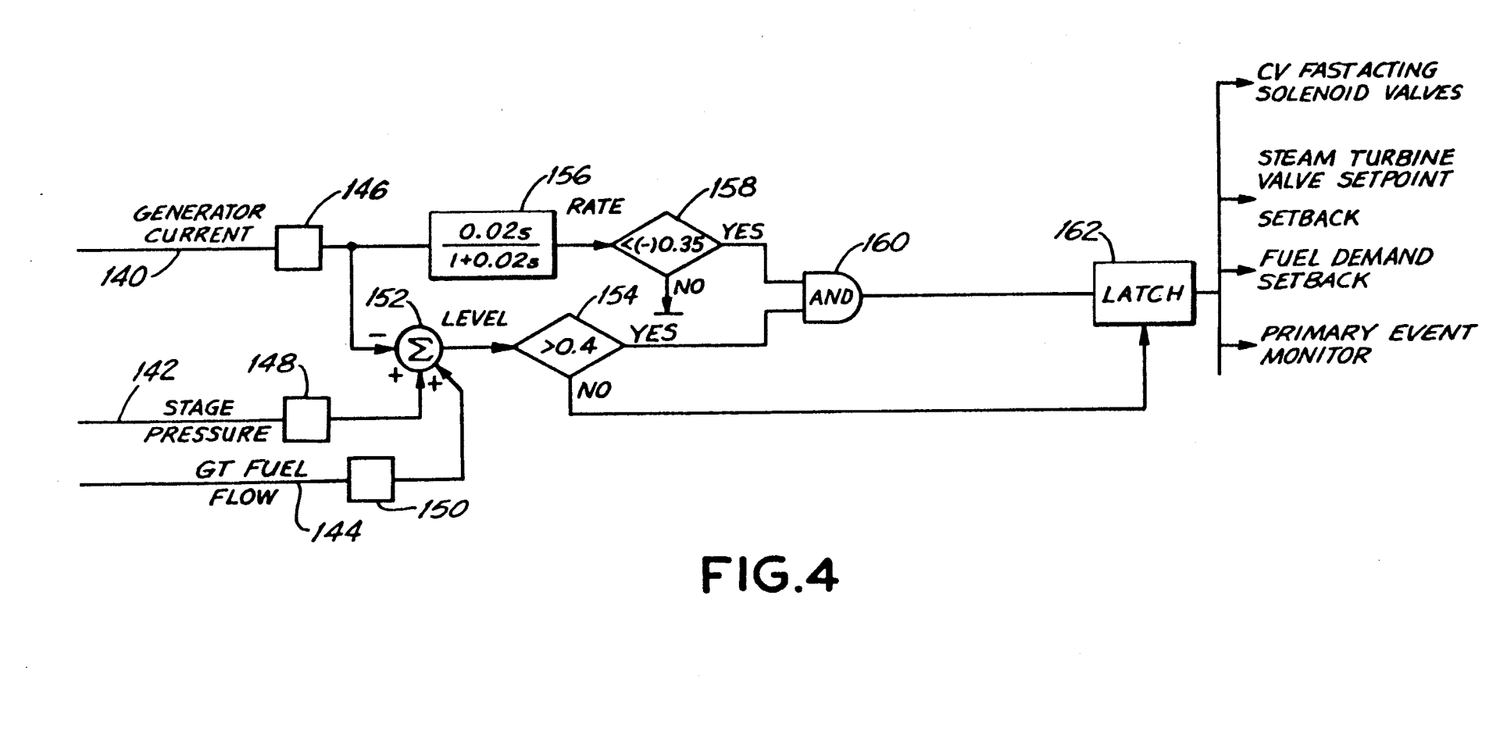
FIG. 4 is a simplified logic diagram illustrating an improved power-load unbalance system for a combined cycle turbine.

A number of operating conditions of the combined cycle plant are input to the control system, such as a speed signal 68 representing actual turbine speed (sensor 44 in FIG. 1), a main pressure signal 70 (sensor 47 in FIG. 1), steam turbine shell metal temperature 72 (sensor 52 in FIG. 1), and a power-load unbalance input signal 74 (FIG. 4). Additional preselected or variable set points or reference signals are generated by digital computer programs designated as a unit startup program 76, a unit loading program 78, and a steam turbine startup program 80.

One output of the steam turbine startup program 80 is to a steam control valve set point generator 82 providing a control valve set point signal 84 to position the controlling steam control valves between 0% and 100% open. A second output from the steam turbine startup program 80 is a selectable speed reference signal 86 representing a desired steam turbine speed As will be explained, the steam turbine reference may be used to control shaft speed for various intermediate speeds used in the gas turbine start-up cycle.

Similarly, one output from the unit loading program 78 is to a gas turbine speed governor set point generator 88. One output provided from set point generator 88 is a speed reference signal 90 representing a desired shaft speed selected to be between 95% to 107% of rated speed.

Outputs from the unit startup program 76 include a time scheduled output value 92 supplied to the steam turbine startup program, startup fuel schedule signal 94 designed to provide certain limiting functions necessary to gas turbine starting, a steam turbine acceleration reference signal 96 and a gas turbine acceleration reference signal 98.

Several called for values of gas turbine fuel flow are selected by a gas turbine acceleration control 100 and a gas turbine speed control 102, a gas turbine exhaust temperature control 104 and a number of other miscellaneous controls which are represented by the single block 106. The outputs from these controlling functional devices may call for widely varying values of gas turbine fuel flow. They are supplied to a minimum value gate 108, together with startup schedule 94. A minimum value gate selects only the one of the applied input signals which will result in the lowest gas turbine fuel flow control signal, as described in the aforementioned U.S. Pat. No. 3,520,133 to Johnson and Loft. A minimum value gate may be an electronic analog device selecting the lowest analog input signal. Conversely, it may be a computer program subroutine which continuously examine digital values representing the outputs of the several control devices and selects the lowest digital number by an algorithm well-known in the art.

Since combustion in the gas turbine cannot be sustained if the fuel flow falls below a minimum value, a settable minimum fuel flow control 110 provides an output to a gas turbine maximum value gating device (or algorithm) 112 along with an input from the gas turbine minimum value gate 108.

Turning to the steam turbine portion of the controls, a steam turbine acceleration control 114, a steam turbine speed control 116 and steam turbine control valve set point generator 82 all provide input to a steam turbine minimum value gate 118. Similar to the gas turbine minimum fuel control, the steam turbine includes a steam turbine minimum flow controller 120 which ensures a minimum steam flow through the control valves. The minimum steam flow serves to cool the steam turbine when running at rated speed under gas turbine fuel control, and during transfer from auxiliary to steam from the HRSG.

The signal from steam turbine minimum value gate 118 and minimum flow controller 120 are applied to a steam turbine maximum value gate 122. The output 66 from the maximum value gate 122 sets the position of the control valves.

In accordance with one aspect of the present invention, the steam turbine acceleration reference signal 96 supplied to the steam turbine acceleration control and the gas turbine acceleration reference signal 98 supplied to the gas turbine acceleration control are selectively set by the unit startup program 76 such that the steam turbine acceleration reference signal is lower by a selectable amount than the gas turbine acceleration reference signal 98. It is by this means that transfer of control under acceleration of the combined unit is accomplished by shifting control from the steam turbine control valve to the gas turbine fuel flow control valve, as will be explained.

The signal from the gas turbine speed control 102 is obtained by summing a gas turbine speed reference signal 90 with a gas turbine actual speed signal 68 in a summing device 124 to obtain a speed error signal. The signal from the gas turbine acceleration control 100 is obtained by comparing a gas turbine acceleration reference signal 98 with a time derivative or rate of change of speed signal 68 so as to provide an acceleration error signal.

Similarly, the steam turbine speed control sums an actual turbine speed 68 with a reference turbine speed 86 in a summing device 126 to provide a speed error signal. The steam turbine acceleration control 114 compares an acceleration reference signal 96 with a time derivative or rate of change of turbine speed so as to obtain an acceleration error signal. The foregoing obtaining of differentiated speed signals and comparisons in the minimum value gates for the respective controls can be accomplished through analog electronic devices as explained in the aforementioned U.S. Pat. Nos. 3,520,133 and 3,340,883. Alternatively, the summations and gating may take place through well known techniques by implementation in a digital computer program.

Figure 3A:
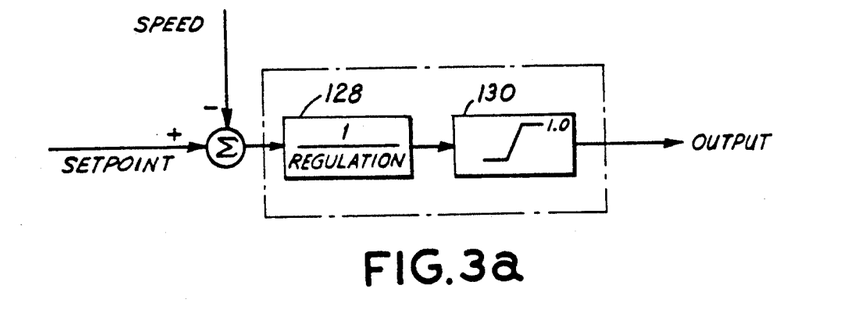
FIG. 3(a) is a simplified block diagram of a typical steam turbine speed control.
Figure 3B:
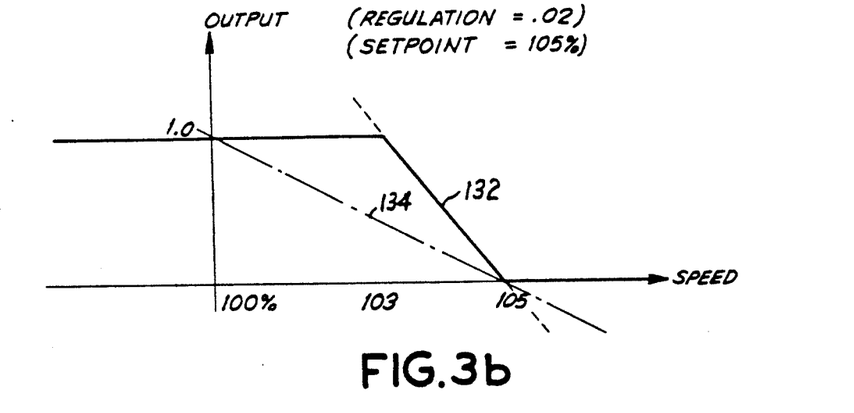
FIG. 3(b) illustrates the variation of output with speed of the speed control shown in FIG. 3 (a)

In order to illustrate the functional working of the speed control 116 for the steam turbine, FIGS. 3(a) and 3(b) show in functional block diagram and graph the output (control valve position) with variation in speed. A selected set point, here 105% of rate of speed is compared with actual speed in a summing device 126. A steam turbine speed control 116 includes means to select the gain or change in valve position with change in speed or speed setpoint, represented by logic block 128 and to limit the signal, represented by function generator indicated in block 130. As shown in FIG. 3(b), a variation in speed of the unit with a set point of 105% and with a speed regulation of 2% results in a steam turbine valve moving from a full open position at 103% of rated speed to a full closed position at 105% of rated speed (see line 132). On the same graph of FIG. 3(b), a dot dash line 134 represents a gas turbine fuel flow control signal with a speed governor set point also at 105% of rated speed, but with a regulation of 5%. Because of a wider or broader regulation of the gas turbine speed control, gas turbine fuel flow varies from full flow at 100% of rated speed to minimum fuel flow at 105% of rated speed. With this type of joint speed control, the gas turbine alone will control speed up to 103% of rated speed with the steam control valves in wide open position, whereafter between 103% and 105% of rated speed, the steam valves will close as well as a continued reduction of gas turbine fuel.

Figure 3C:
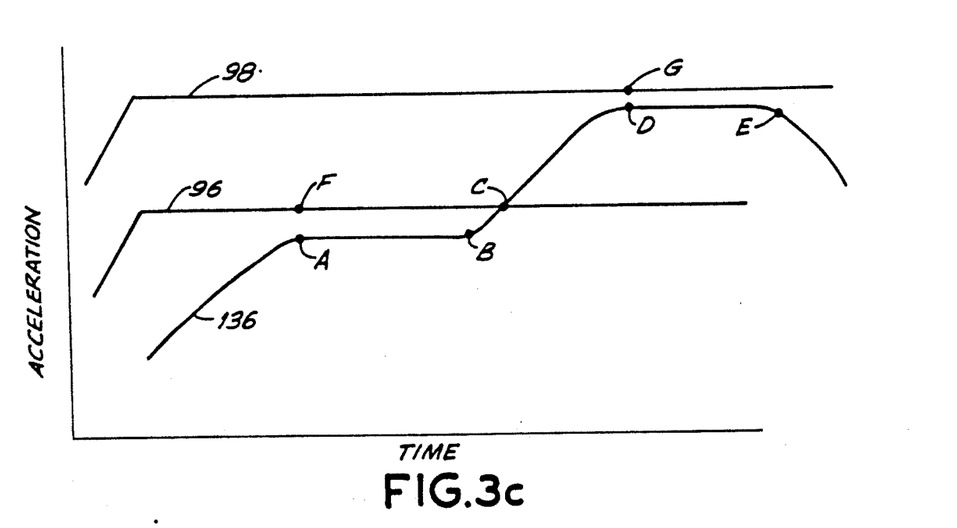
FIG. 3(c) is a simplified time/acceleration graph illustrating transfer of acceleration control from steam turbine to gas turbine.

Reference to FIG. 3(c) of the drawing illustrates a simplified time versus acceleration curve. Actual acceleration of the unit is illustrated by curve 136. The gas turbine acceleration reference signal 98 and the steam turbine acceleration signal 96 are both compared with the actual acceleration 136 and the respective difference values are acceleration error signals. At point A, the steam turbine acceleration controller begins to limit steam turbine valve opening and hence controls acceleration with a constant acceleration error signal AF. At point B, the gas turbine begins to create positive net torque and to accelerate the unit. At point C, the steam turbine control valve is closed to its minimum flow position, as required by the steam turbine acceleration controller. At point D, the gas turbine acceleration controller 100 begins to limit gas turbine fuel flow with a constant acceleration error signal DG. At point E, the gas turbine speed controlled 102 takes over as actual acceleration drops to zero. In this manner, combined cycle unit control is shifted from the steam turbine controller to the gas turbine controller.

A power-load unbalance system, shown in block diagram in FIG. 4, is incorporated in the program of the unified control system 10. The system receives as input three signals; one is an electrical signal 140 from sensor 50 indicative of generator electrical power output, the second is a steam turbine stage pressure signal 142 from pressure sensor 48 indicative of the mechanical power produced by the steam turbine, and the third is a fuel flow signal 144 from the command for the fuel flow control valve 18 indicative of mechanical power produced by the gas turbine. Since the power output and two power input measurements are all in different dimensional quantities, they are normalized to a dimensionless number representing a percentage of what they would be under rated conditions, e.g. the actual turbine stage pressure is divided by rated turbine stage pressure, the actual fuel flow command signal (less the minimum fuel) is divided by the command signal for full load rated fuel flow (less the minimum fuel), etc. Secondly, in the case of the two mechanical power measurements, they are each multiplied by another scaling factor reflecting the relative contribution of the steam turbine and the gas turbine under rated conditions. For example, the steam turbine power input might carry a weight of ⅓ and the gas turbine power input a weight of ⅔. The scaling operations are indicated by block 146 for the electrical power signal 140; block 148 for the steam turbine stage pressure signal 142; block 150 for the gas turbine fuel flow signal 144.

The two power input signals and the load signal are algebraically summmed in a summing device 152. The output from summing device 152 is supplied to a comparator device 154, in a lower logic branch, which provides an output in the event that the mismatch of power of the combined steam and gas turbine over power output of the generator is greater than a selected threshold quantity, here selected as 0.4 per unit or 40%. In the upper logic branch, a signal proportional to generator current is differentiated with respect to time as shown in logic block 156. In actual practice, this is implemented in a digital computer program by a suitable algorithm, although it could also be implemented in a discriminator network. The rate of load change is subjected to a comparison in logic device 158, which provides an output in the event that the time rate of change of power output is less than a selected negative rate. The outputs from the two comparator devices 154, 158 are supplied to a logical AND 160 which, in turn, provides an output signal to a latch 162. The latch output signals various control devices to take rapid action to reduce the power input.

OPERATION

The unit startup program schedules the entire startup after a start command by sequentially setting the proper acceleration reference 96, 98, the startup fuel reference 94 and commands 92 to the steam turbine startup program 80, based on input of shaft speed and preprogrammed logic.

The steam turbine startup program implements the commands from the unit startup program by issuing speed setpoint values 86 to the steam turbine speed control and raise/lower commands to the steam turbine valve setpoint generator 82, based on limitations imposed by the turbine metal temperatures related to startup steam conditions as determined by inlet pressure and temperature.

The startup and loading of a combined cycle turbine with the new control features will now be described with emphasis on the steam turbine control and its interaction with the gas turbine control.

Prior to the startup, the steam turbine valve setpoint 84 is set at zero and the output of the steam turbine minimum value gate 118 is, therefore, also zero. The steam turbine minimum flow control 120 is also set at zero, because the speed is at zero. Thus, the steam flow command signal is zero and the controlling steam admission (control) valve(s) 26 are closed. The steam turbine stop valve(s) 24 will be opened when the unit control system is reset prior to initiation of a start sequence.

When a "start" command is given, the unit startup program will set the maximum acceleration allowed for the initial steam start to the steam turbine acceleration control 114, and send a gas turbine "purge" speed reference signal to the steam turbine startup program. This program will then, if steam conditions and turbine metal temperatures are acceptable, adjust the setpoint 86 to the steam turbine speed control to the purge speed level and begin to raise the steam turbine valve setpoint 84 in a rate limited manner towards a maximum allowed steam flow for startup. (This flow will, for example, be determined by the capacity of the auxiliary steam source 58 whose supply valve 60 is open.) This action will begin to open the steam turbine control valves 26 through the steam turbine minimum value gate, since both the output of the steam turbine acceleration control 114 and steam turbine speed control 116 will initially go to their upper limits. This is because the speed is constant (no actual acceleration) and near zero (low actual speed, since turning gear speed equals a few RPM) at the time of the "start" command.

Due to the breakaway friction and large inertia of the combined gas and steam turbine shaft, the steam turbine control valves 26 will need to open a considerable amount, before the shaft begins to accelerate as a result of the torque generated by the steam flowing through the steam turbine. Shortly, thereafter, the speed is likely to rise so rapidly that the steam turbine acceleration control 114 becoming limiting and reduces the steam turbine valve opening through the steam turbine minimum value gate 118. The shaft speed will then continue to rise at the acceleration rate selected by the steam turbine acceleration reference until the speed approaches the "purge" speed reference set for the steam turbine speed control. At this time, the steam turbine speed control will take over control by reducing its output speed error signal to the steam turbine minimum value gate until it becomes limiting. Shortly thereafter, the shaft will be running in a steady mode at the reference "purge" speed.

The unit startup program 76 will determine that purge speed has been reached and begin to time out the required length for purging of the entire gas turbine and HRSG gaspath. After the purge time has elapsed, the unit startup program will send a command to the steam turbine startup program to reduce the speed reference 86 to "ignition" speed which is lower than the "purge" speed. The new speed will be reached by the steam turbine speed control closing the steam valves sufficiently for a speed decay followed by stabilization at the new level.

The unit startup program will now initiate a conventional ignition and warmup sequence as used for a simple cycle gas turbine. In addition to carrying out a programmed fuel flow command to increase on a programmed schedule, the unit startup program supplies an acceleration reference 98 to the gas turbine acceleration control 100. The unit startup program will also send a command to the steam turbine startup progam to raise the speed reference to near rated (i.e., 95% of rated). This will result in the reopening of the steam turbine control valves to their maximum startup flow position as both the steam turbine acceleration control 114 and steam turbine speed control 116 will demand a higher valve opening. The shaft will now begin to accelerate under full steam turbine startup torque.

At the low ignition speed and even as the shaft begins to accelerate, the gas turbine produces no positive torque, and full control of speed and acceleration is via the steam control valves positioned by the lowest of the demands from the steam turbine acceleration control 114, the steam turbine speed control 116, and the steam turbine valve setpoint 82. Above approximately one half of rated speed, the torque produced by the gas turbine begins to become significant, and thereafter rises rapidly with speed, resulting in higher acceleration than with steam induced torque alone.

As the acceleration increases above the steam turbine acceleration reference, the steam turbine acceleration control 114, using its steam turbine acceleration reference 96, which is set lower than the reference 98 of the gas turbine acceleration control 100, will now commence to close the steam turbine valves through a signal to the steam turbine minimum value gate 118, and the combined shaft will accelerate solely under the control of the gas turbine acceleration control 100 (which is providing the lowest fuel flow control signal to the gas turbine minimum value gate 108). As the combined shaft reaches rated speed, the gas turbine speed control will take over and regulate near rated speed. This sequence is illustrated in FIG. 3(c).

At this time, the steam turbine speed control (with a reference slightly lower than rated) will call for the steam valves to be closed, which will be the lowest value arriving at the steam turbine minumum value gate and, hence, the output of this gate will continue to be effective to close the steam valves, even though the steam turbine acceleration control 114 will begin to call for steam valve opening as the acceleration decreases. The resulting steam flow command will, therefore, be determined by the steam turbine minimum flow control 120, which will be supplying the largest input to the steam turbine maximum value gate. The final result of these control actions is that the combined shaft is running at rated speed completely controlled by the gas turbine speed control 102, the steam turbine is idling with only cooling flow passing through it, as controlled by the steam turbine minimum flow control 120, sufficient to cool the steam turbine. The steam turbine control reference 86 is set at less than rated and the steam turbine valve setpoint is still at maximum startup flow.

"Synchronization" consists of connecting the generator 6 to the electrical output grid, whereafter, the speed of the turbines is fixed by the grid electrical frequency. After the unit has been synchronized, the steam turbine valve setpoint 84 is reduced to zero and the steam turbine speed reference is raised to maximum (i.e., 105% of rated) after which the steam supply is transfered from auxiliary source 58 to the HRSG 8. The steam flow command before transfer is still determined by the steam turbine minimum flow control 120 through the steam turbine maximum value gate 122 sufficient to maintain steam turbine cooling.

When steam from the HRSG is available at sufficient flow rate as determined by steam pressure measurements, a command will be given by the steam turbine startup program 80, which will then automatically raise the steam valve setpoint 84. The setpoint will be increased to fully open the steam valve at a rate determined under constraint of steam turbine metal temperature, steam pressure and temperature. At the end of this procedure, the steam control valves 26 and 28 will be fully open and the steam valve and turbine will accept all the steam from the HRSG at the pressure required for the flow to pass through the turbine where it is expanded to the condenser while delivering energy to the shaft.

Operation of the improved power load unbalance system is as follows. When the sum of the input powers of the steam turbine and gas turbine exceeds the generator electrical output power by a fixed amount, it is an indication of imminent rapid speed rise. When further, the rate of change of load is negative and less than a selected value, it is an indication that the unbalance is not due to load variation or oscillation. Coincidence of both such conditions in the power-load unbalance system will initiate immediate fast closing of the turbine steam control valve 26, through a special fast closing input device on the valve actuator, and also set the control valve set point 84 and fuel control setpoints 94 to zero position. This will cause the steam flow command signal to be completely overridden by the fast closing device, and it will cause the fuel flow to the gas turbine to be rapidly reduced to minimum fuel flow. The power-load unbalance system will reset automatically once the initiating condition has disappeared and the steam flow command signal will again take over control of the valve position. The control valve setpoint remains at zero, however, until the machine has been resynchronized and is ready to be loaded as described for startup of the unit.

While there has been described what is considered to be the preferred embodiment of the invention, other modifications will occur to those skilled in the art, and it is desired to include in the appended claims all such modifications which fall within the true spirit and scope of the invention.

We claim:

1. Method for starting and controlling a combined cycle turbine of the type having a gas turbine with a fuel flow control valve and a steam turbine with at least one steam control valve both disposed on a single shaft and having a heat recovery steam generator heated by said gas turbine and connected to supply steam to said steam control valve, said combined cycle turbine having a unified control system and driving a load, and also having an auxiliary steam source connected to said steam control valve, said method comprising:

controlling of steam from the auxiliary steam source with said steam control valve to crank said combined cycle turbine for starting, initiating and controlling fuel flow to the gas turbine with said fuel flow control valve and initiating combustion, controlling initial acceleration of said combined cycle turbine with said steam control valve on auxiliary steam, coordinating control of said combined cycle turbine by said steam control valve and the fuel control valve with said unified control system, transferring acceleration control during a smooth acceleration phase of the combined cycle turbine to said fuel flow control valve and gradually reducing the opening of said steam control valve to a minimum value when the turbine reaches rated speed.

2. Method for starting and controlling a combined cycle turbine of the type having a gas turbine with a fuel flow control valve and a steam turbine with at least one steam control valve both disposed on a single shaft and having a heat recovery steam generator heated by said gas turbine and connected to supply steam to said steam control valve, said combined cycle turbine having a unified control system and driving a load, and also having an auxiliary steam source connected to said steam control valve, said method comprising:

controlling of steam from the auxiliary steam source with said steam control valve to crank said combined cycle turbine for starting, initiating and controlling fuel flow to the gas turbine with said fuel flow control valve and initiating combustion, controlling initial acceleration of said combined cycle turbine with said steam control valve on auxiliary steam, transferring control during acceleration of the combined cycle turbine to said fuel flow control valve and reducing the opening of said steam control valve to a minimum value when the turbine reaches rated speed, connecting said combined cycle turbine to a load, transferring steam supply from said auxiliary source to said heat recovery steam generator, opening said at least one steam control valve fully to increase power output to said load, and controlling load applied to the combined cycle turbine by varying a command signal to said fuel flow control valve.

3. Method for starting and controlling a combined cycle turbine of the type having a gas turbine with a fuel flow control valve and a steam turbine with at least one steam control valve both disposed on a single shaft and having a heat recovery steam generator heated by said gas turbine and connected to supply steam to said steam control valve, said combined cycle turbine having a unified control system and driving a load, and also having an auxiliary steam source connected to said steam control valve, said method comprising:

controlling of steam from the auxiliary steam source with said steam control valve to crank said combined cycle turbine for starting, initiating and controlling fuel flow to the gas turbine with said fuel flow control valve and initiating combustion, controlling initial acceleration of said combined cycle turbine with said steam control valve on auxiliary steam, transferring control during acceleration of the combined cycle turbine to said fuel flow control valve and reducing the opening of said steam control valve to a minimum value when the turbine reaches rated speed, wherein said fuel flow is controlled partially in accordance with a gas turbine acceleration error signal determined by comparing a gas turbine acceleration reference to actual acceleration, wherein the steam flow is controlled partially by a steam turbine acceleration error determined by comparing a steam turbine acceleration reference with actual acceleration, and wherein said transferring step comprises setting said steam turbine acceleration reference lower than said gas turbine acceleration reference, whereby increasing acceleration of the combined cycle turbine will first be controlled by the steam valve until the gas turbine is capable of supplying acceleration torque and then controlled by the fuel flow control valve.

4. Method for starting and controlling a combined cycle turbine of the type having a gas turbine with a fuel flow control valve and a steam turbine with at least one steam control valve both disposed on a single shaft and having a heat recovery steam generator heated by said gas turbine and connected to supply steam to said steam control valve, said combined cycle turbine having a unified control system and driving a load, and also having an auxiliary steam source connected to said steam control valve, said method comprising:

controlling of steam from the auxiliary steam source with said steam control valve to crank said combined cycle turbine for starting, initiating and controlling fuel flow to the gas turbine with said fuel flow control valve and initiating combustion, controlling initial acceleration of said combined cycle turbine with said steam control valve on auxiliary steam, transferring acceleration control during a smooth acceleration of the combined cycle turbine to said fuel flow control valve and gradually reducing the opening of said steam control valve to a minimum value when the turbine reaches rated speed, wherein the step of controlling steam from the auxiliary steam source further includes controlling auxiliary steam flow in accordance with a speed error signal determined by comparing a steam turbine speed reference with actual speed and positioning said steam control valve in accordance with said speed error signal, and setting said steam turbine speed reference first at gas turbine purging speed and subsequently lowering the steam turbine speed reference to gas turbine ignition speed.

5. The method according to claim 1, wherein the step of controlling steam from the auxiliary steam source further includes controlling auxiliary steam flow in accordance with a minimum opening of the steam control valve, which is selected to provide steam flow sufficient to cool the steam turbine.

6. The method according to claim 2 wherein the step of transferring steam supply from said auxiliary source to said heat recovery steam generator further includes the steps of:

determining availability of heat recovery generator steam by measuring steam pressure, while maintaining minimum auxiliary steam flow sufficient to cool the steam turbine until steam pressure reaches a preselected value, and causing said steam turbine control valve opening to increase until it is fully open while monitoring selected steam turbine operating contraints.

* * * * *